United States Patent [19]

Meyer

[11] Patent Number: 4,672,844
[45] Date of Patent: Jun. 16, 1987

[54] TESTING APPARATUS WITH IMPROVED FOLLOWER MECHANISM

[75] Inventor: Walter E. Meyer, Leonard, Mich.

[73] Assignee: Schenck Pegasus, Troy, Mich.

[21] Appl. No.: 844,461

[22] Filed: Mar. 26, 1986

[51] Int. Cl.⁴ .......................................... G01M 17/04
[52] U.S. Cl. .................................................. 73/118.1
[58] Field of Search ................. 73/119 R, 118.1, 116, 73/117.3, 669

[56] References Cited

U.S. PATENT DOCUMENTS

| | | | |
|---|---|---|---|
| 3,555,893 | 1/1971 | Holzman | 73/669 |
| 3,718,033 | 2/1973 | Petersen | 73/669 |
| 3,821,893 | 7/1974 | Klinger et al. | 73/669 |
| 3,827,289 | 8/1974 | Borg | 73/669 |

FOREIGN PATENT DOCUMENTS 219434 12/1983 Japan ................................ 73/118.1

*Primary Examiner*—Jerry W. Myracle
*Attorney, Agent, or Firm*—Reising, Ethington, Barnard, Perry & Milton

[57] ABSTRACT

Testing apparatus is disclosed for vehicle steering mechanisms and similar devices for applying a controlled force to a test member. A vertically reciprocable platen carries a hydraulic actuator for applying controlled force to a pivotable test member. The hydraulic actuator is reciprocable along a transverse axis and is connected with the test member by a pivotable coupling. A pivotable link is pivotally connected with a stationary frame and with the mounting frame of the actuator. The distance between the two pivot points on the pivotable link is the same as the distance between the pivot axis of the test member and the pivot axis of the coupling whereby the actuator is caused to traverse an arcuate path when the platen is reciprocated and it thereby follows the arcuate path of the pivotal test member.

9 Claims, 3 Drawing Figures

TESTING APPARATUS WITH IMPROVED FOLLOWER MECHANISM

FIELD OF THE INVENTION

This invention relates to testing apparatus; more particularly, it relates to such apparatus for imparting controlled motion and applying controlled forces to a movable test member.

BACKGROUND OF THE INVENTION

In the manufacture of components which are to be used in a product, such as an automobile, it is a common practice to subject selected components to test procedures for purposes of quality assurance. Such test procedures may include testing in which the component is subjected to motions and forces which simulate the actual use for which it is designed or other motions and forces selected according to other criteria. Also, testing of components by subjecting them to programmed motions and forces is useful in the development and design of such components and parts.

The need for such testing is commonplace in the automotive industry. A particular example is an automotive power steering unit of the rack and pinion type with hydraulic assist. This vehicle component comprises a body for mounting of the vehicle chassis and containing the rack and pinion and hydraulic actuator and having a steering column input shaft to the pinion. Each end of the rack is coupled through a pivotable tie rod with the steering arm of one of the front vehicle wheels. Testing apparatus for such a mechanism heretofore known leaves much to be desired especially in respect to simulating the motions and forces to which the mechanism is subjected during actual use.

Testing apparatus is known for vehicle steering mechanisms wherein the tie rods are subjected to programmed motions and forces during programmed actuation of the steering column input to the mechanism. In the known testing apparatus, servo systems are used for sequentially pivoting the tie rods to predetermined angles and, while the angular positions are maintained, the tie rods are subjected to programmed forces. Such a testing procedure is very time consuming. Furthermore, since the tie rods are subjected to test forces only at discrete angular positions, it does not simulate actual operating conditions.

A general object of this invention is to provide an improved test apparatus which overcomes certain disadvantages of the prior art.

SUMMARY OF THE INVENTION

In accordance with this invention, improved testing apparatus is provided for subjecting a test-piece to a wide variety of controlled conditions, including position and loading, and to more accurately simulate actual working conditions. More particularly, the invention provides testing apparatus for imposing a controlled loading or force on a workpiece continuously during controlled positioning or movement of the test-piece.

Further, in accordance with this invention, testing apparatus is provided for applying force to a test-piece having a movable test member adapted for predetermined movement. The test-piece is held by fixed support means and a movable support means is movable along a first axis and carries a force applying means which is mounted thereon for translational movement along a second axis which is transverse to the first axis. A coupling means is connected with the force applying means and with the test member for transmitting force thereto. A linkage means movable concurrently with the movable support means is coupled to the force applying means for moving it along the second axis so that the movement of the force applying means imparts said predetermined movement to the test member whereby the force applying means can apply a controlled force to the test member during such movement.

Further, according to the invention, the linkage means is a pivotable link pivotally coupled with the fixed support means and pivotally coupled with the force applying means.

Further, according to the invention, the test member is of a type having a pivotal connection on the test-piece and the coupling means has a pivotal connection with the force applying means. The pivotal link has a pivotal connection with the force applying means and a pivotal connection with the fixed support means; the distance between the pivotal connections of the pivotal link is equal to the distance between the pivotal connections of the test member. Further, according to the invention, the movable support means is a platen and actuator means is provided for moving the platen along the first axis. A movable slide is mounted on the platen for movement along said second axis and the coupling means is mounted on the slide.

Further, according to this invention, the force applying means comprises a linear motor having a mounting frame supported for translational movement along the second axis on the platen and an actuating shaft movable in the direction of said second axis relative to the mounting frame and connected with the coupling means. The motor is preferably a hydraulic motor and means are provided for controlling energization thereof for applying a programmed force to the coupling means during movement of the platen along the first axis.

A complete understanding of this invention will be obtained from the detailed description that follows taken with the accompanying drawings.

BEST MODE FOR CARRYING OUT THE INVENTION

Figure 1:
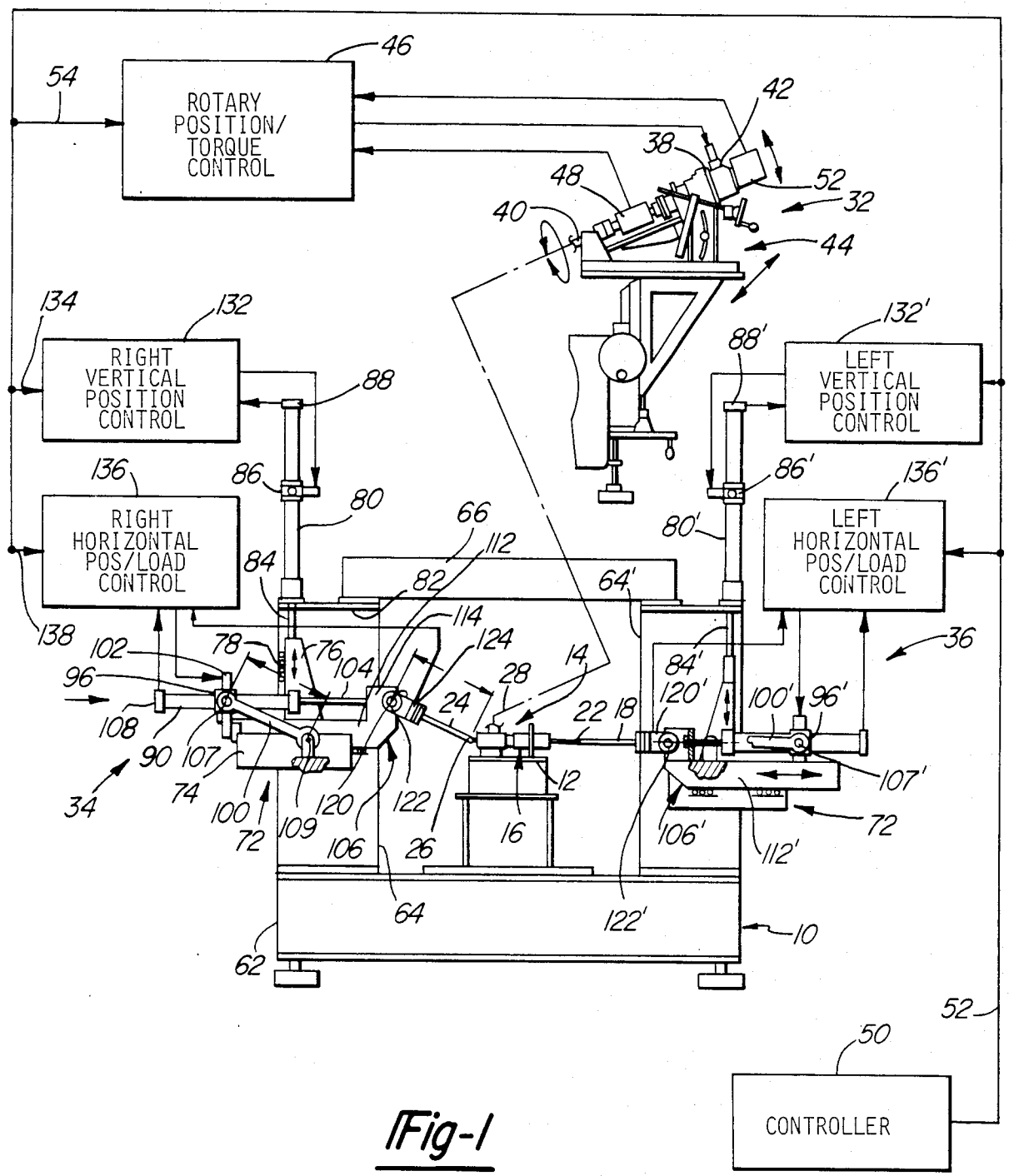
FIG. 1 is a diagrammatic representation of the testing apparatus of this invention.

Referring now to the drawings, there is shown an illustrative embodiment of the invention in a testing apparatus especially adapted for test-pieces having a pivotal test member, such as a vehicle steering mechanism. It will be appreciated as the description proceeds that the invention is useful in other embodiments and also for application to a wide variety of test-pieces.

As shown in FIG. 1, the testing apparatus comprises, in general, a machine frame 10, suitably floor mounted, which is provided with a stationary holder or test stand 12 adapted to support a test-piece 14. The test-piece 14 in the illustrative embodiment is a vehicle steering mechanism which will be described subsequently. For the purpose of orientation, the test-piece 14 is depicted as though installed in a vehicle being viewed from the front, i.e. the left side of FIG. 1 corresponds to the right side of the steering mechanism (and vehicle) and vice versa. The testing apparatus is adapted to subject the test-piece 14 to controlled motions and loading forces which may be programmed to simulate actual roadway operating conditions or in accordance with other engineering criteria. Although not illustrated, the test stand 12 may be enclosed in an environmental test chamber so that the test-piece may be subjected to desired environmental conditions.

The test-piece 14, for example, is a steering mechanism of the rack and pinion, power assist type. As such, it comprises a body 16 containing a rack and pinion and which is fixedly mounted on the test stand 12. The steering mechanism also includes a left side tie rod 18 which is connected by a pivot or ball joint 22 with the rack of the steering mechanism. Similarly, it includes a right side tie rod 24 which is connected with the rack of the mechanism by a pivot or ball joint 26. The tie rods 18 and 24 are adapted for pivotal connection with the respective steering arms of the left and right front wheels of the vehicle on which it is used. The steering mechanism also is provided with an input shaft 28 which is adapted to be connected with the steering column of the vehicle. In actual use of the steering mechanism, the steering torques are applied through the input shaft 28 to the pinion of the mechanism and the manually applied or power assisted steering effort is applied through the rack and the corresponding tie rods 18 and 24 to the dirigible wheels. The loading forces on the steering mechanism depend upon the torque applied to the input shaft 28 and the position thereof and also the resistance to movement of the tie rods 18 and 24 which is transmitted thereto from the roadway forces on the dirigible wheels. It is desired to apply controlled input torque or position to the input shaft 28 and to apply controlled force or position to each of the tie rods 18 and 24 for testing of the steering mechanism.

For the purpose of controlling torque or position of the input shaft 28, a steering input system 32 is provided. For the purpose of positioning or controlling the loading applied to the right hand tie rod 18, a right hand tie rod loading system 34 is provided. Similarly, a left hand tie rod loading system 36 is provided for controlling the position or loading applied to the tie rod 24.

The steering input system 32 comprises a hydraulic rotary motor 38 coupled with the input shaft 28 by a shaft 40 and controlled by a servo valve 42. The motor 38 is mounted on an adjustable stand 44 so that it can be adjusted for position and angularity to adapt it for connection with the shaft 28 of the test-piece 14. The motor 38 is controlled by a rotary position/torque control system 46 which comprises a closed loop servo. A torque transducer 48 is coupled in the shaft 40 and develops a signal corresponding to the applied torque which is fed back to the control system 46. A position transducer 49 is coupled with the shaft 40 and develops a signal corresponding to the angular position of the shaft 40. This signal is fed back to the control system 46. The control system 46 is electrically connected through a bus 52 with a central controller 50 which supplies control signals over the bus 52 to an input 54 of the control system 46. This control signal may select operation of the control system in either the torque control mode or a position control mode. Further, an input command signal representing the value of applied torque or angular position in real time, as the case may be, is applied over bus 52 and input 54 to the control system 46. The control system 46 develops an output command signal which is applied to the servo valve 42 to produce the commanded torque or position of the shaft 40 in accordance with a program established by the controller 50.

Before describing further detail of the right hand and left hand tie rod loading systems 34 and 36, respectively, it will be helpful to consider the structural arrangement of the machine frame 10. The frame 10 comprises a support base 62 which supports the test stand 12 and also comprises a right hand frame 64 and a left hand frame 64'. The right hand and left hand frame 64 and 64', respectively, are connected together by a header 66. The right hand frame 64 supports the right hand tie rod loading system 34 and the left hand frame 64' supports the left hand tie rod loading system 36.

Figure 2:
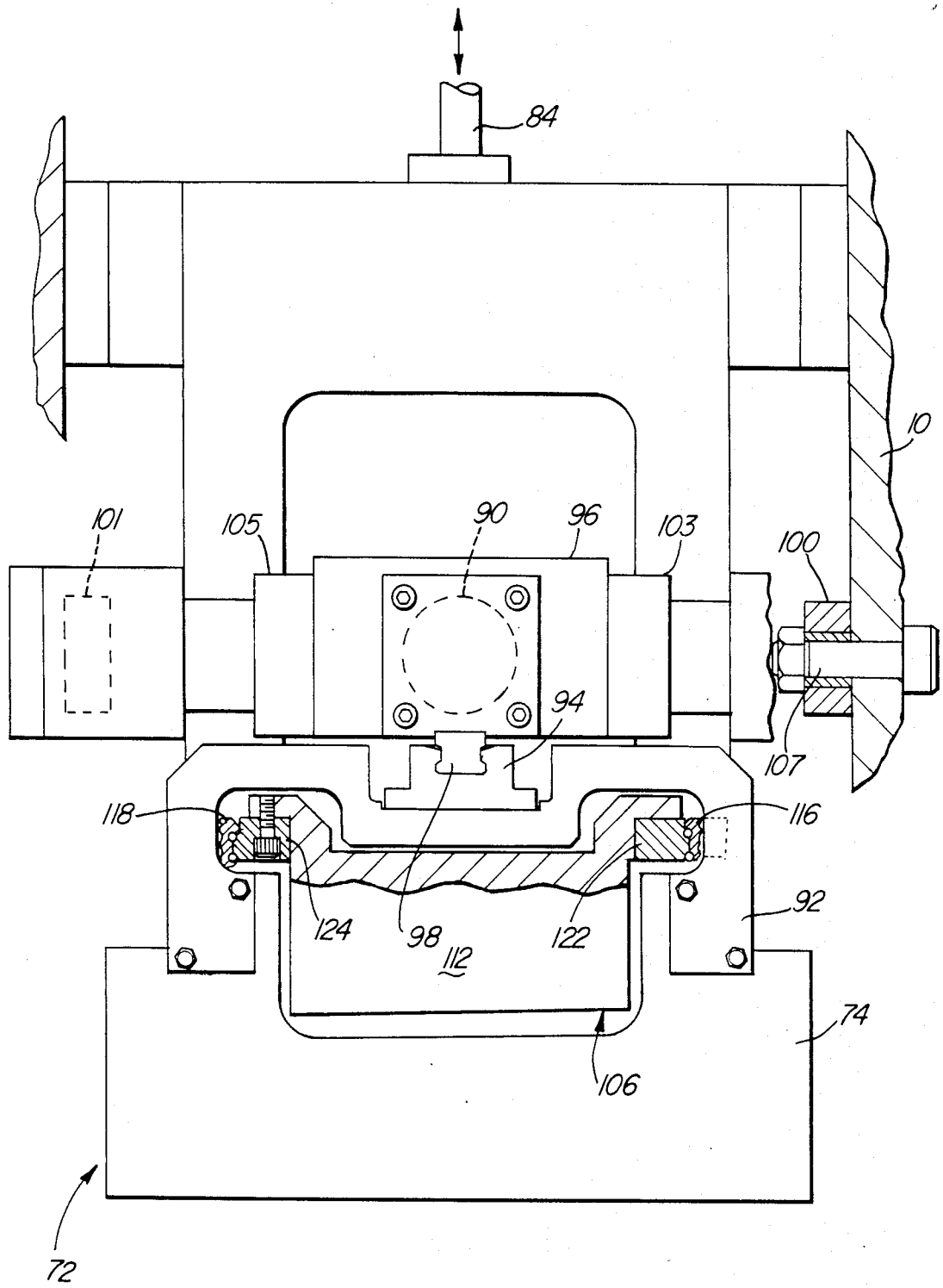
FIG. 2 is a view of the apparatus looking in the direction of the arrow 2 in FIG. 1.

The tie rod loading system 34 and 36 will now be described in detail with reference FIGS. 1 and 2. These loading systems are of the same construction and the description will be given for the right hand tie rod loading system 34. The reference numerals applied to the right hand loading system 34 are applied with a prime symbol to the corresponding parts of the left hand tie rod loading system 36.

The right hand tie rod loading system 34 comprises a movable platen 72 having a horizontal bed 74 and a vertical slide plate 76. The movable platen 72 is adapted for movement along a vertical axis by a guideway represented schematically by bearing elements 78 on the right hand frame 64. A hydraulic actuator 80 is mounted on a flange 82 of the right hand frame 64 for moving the platen 72. The actuator 80 comprises a stationary cylinder with a movable piston having a piston rod 84 connected with the vertical slide plate 76 of the platen 72. The actuator 80 is provided with a servo valve 86. It is also provided with a position sensor 88 which develops an electrical signal corresponding to the position of the platen 72.

An actuator 90 for applying force to the tie rod 24 is mounted on the horizontal bed 74 of the platen 72 for movement therewith. For this purpose, a mounting bracket 92 is secured to the bed 74 and is provided with a horizontal guideway 94 which extends transversely of the movable platen 72 and laterally of the machine frame. The actuator 90 is a hydraulic cylinder and piston with a mounting frame 96 disposed at the central part of the cylinder. The mounting frame 96 carries a slideway 98 which is disposed within the guideway 94 to provide for translational movement of the actuator 90 along the transverse axis of the machine. Thus, the actuator 90 is horizontally slideable on the platen 72; the arrangement for causing relative motion of the actuator 90 along the guideway 94 will be described subsequently. The actuator 90 is provided with a servo valve 102 which is disposed on the mounting bracket 96. The piston rod 104 of the actuator 90 is connected to a transverse slide or carriage 106 which will be described subsequently. The actuator 90 is also provided with a position sensor 108 which develops an electrical signal corresponding to the position of the carriage 106.

The position of the actuator 90 is controlled by a pair of links 100 and 101. For this purpose, the mounting frame 96 of the actuator 90 is provided with a pair of trunnions 103 and 105 extending laterally therefrom. The pivot link 100 is pivotally mounted to the trunnion 103 about a pivot axis 107. The other end of the pivot link 100 is pivotally connected with the frame 10 for pivotal motion about a pivot axis 109. Pivot link 101 is similarly connected between trunnion 105 and frame 10. The action of the pivot links 100 and 101 will be described subsequently.

The carriage 106 comprises a horizontal bed 112 and a vertical wall 114 at the forward end. The bed 112 of the carriage 106 is supported on the bed 74 of the movable platen 72 for reciprocating movement along a transverse axis of the machine. For this purpose, the bed 74 of the platen 72 is provided with a pair of guideways 116 and 118 extending transversely of the machine. The bed 112 of the carriage 106 is provided with a pair of slideways 122 and 124 which coact with the guideways 116 and 118, respectively. The end of the piston rod 104 of the actuator 90 is connected to the vertical wall 114 of the carriage 106 for movement of the carriage along the guideways 116 and 118.

A coupling 120 is mounted on the carriage 106 and is adapted for connection with the test member 24 of the test-piece 16. The coupling 120 is pivotally mounted on the vertical wall 114 of the carriage 106 for pivotal motion about a pivot axis 122 in the horizontal plane. It is also mounted for pivotal action about a vertical pivot axis (not shown) thus providing a universal joint to facilitate alignment of the coupling with the tie rod 24. The coupling 120 is adapted to be connected with the tie rod 24 by a screw thread connection or other suitable form of rigid connection. The coupling 120 is provided with a force transducer or load cell 124 which develops an electrical signal corresponding to the force applied through the coupling to the tie rod 24.

The actuator 80 for the right hand tie rod loading system 34 is controlled by a right vertical position control system 132. The position control system 132 receives an input command signal from the controller 50 on the bus 52 and the input 134. The control system 132 includes a closed loop servo which supplies an output command signal to the servo valve 86 and receives a position feedback signal from the position senser 88. The actuator 90 of the right hand tie rod loading system 34 is controlled by a right horizontal position/load control system 136. The control system 136 receives an input command signal from the controller 50 through the bus 52 and the input 138. The control system 136 comprises a closed loop servo which provides an output command signal to the servo valve 102 and receives a position feedback signal from the position sensor 108 and a load feedback signal from the load cell 124. The vertical position control system 132 controls the actuator 80 to move the movable platen 72 along the vertical axis in accordance with a predetermined program provided by the command signal from the controller 50. The actuator 90 may be operated in a positioning mode or load applying mode as commanded by the command signal from the controller 50. When the system 136 is operated in a positioning mode, the actuator 90 will maintain commanded positions according to the program provided by the controller 50. When it is operated in a load applying mode, the actuator 90 provides a load on the tie rod 24 in accordance with a predetermined program provided by the controller 50.

In accordance with this invention, linkage means is provided to cause the actuator 90 to be moved translationally in such a manner that it follows a path corresponding to that of the pivot axis 122 of the coupling 120. More specifically, if it is assumed that the piston rod 104 is held fixed relative to the cylinder of actuator 90, the pivot axis 107 on the actuator 90 follows a path which is of the same configuration in the vertical plane as the path of the pivot axis 122 of the coupling 120; moreover, the pivot axes remain at a fixed distance from each other throughout the vertical travel of the platen 72. This control of the position of the actuator 90 by the linkage means, comprising links 100 and 101, permits controlled force variations to be applied to the tie rod 24 unaffected by and independently of the angular position of the tie rod. Further, a controlled force can be applied continuously during movement of the tie rod 24.

Figure 3:
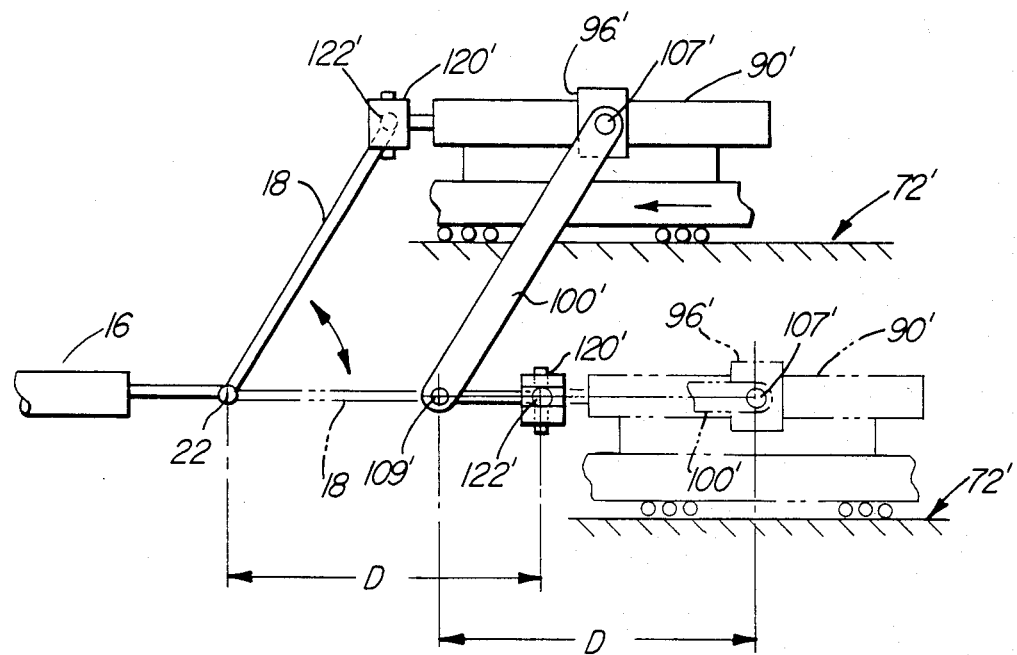
FIG. 3 is a diagrammatic representation of certain parts of the apparatus to aid the explanation of operation.

FIG. 3 is a diagrammatic representation of the linkage means of the left hand tie rod loading system. FIG. 3 depicts the linkage means in two alternate positions and illustrates how the actuator 90' follows the motion of the tie rod 18. The platen 72' is shown in a lower position in interrupted lines and in this position, the actuator 90' is substantially aligned with the tie rod 18. In this position, the link 100' is in a horizontal position. It is noted that the distance D between the pivot axes 107' and 109' on the link 100' is the same as the distance between the pivot axes 122' on the coupling 120' and the pivot axes 22 on the tie rod 18. When the movable platen 72' is raised it carries the actuator 90' with it to the position shown in full lines in FIG. 3. This vertical movement of the platen 72' cause the tie rod 18 to pivot upwardly by reason of its connection with the coupling 120'. Similarly, this vertical movement of the platen 72' causes the link 100' to pivot about its fixed axis 109'. The pivotal motion of the link 100' causes the actuator 90' to be translationally moved along its horizontal axis as provided by the movement of the slideway 98 in the guideway 94. Thus, raising or lowering the platen 72' causes pivotal motion of the tie rod 18 and the link 100'. For a given movement of the platen 72', the pivot axis 122' and the pivot axis 107' both have the same vertical component of displacement. By reason of the link 100', both pivot axes 122' and 107' will also have the same horizontal component of displacement. Thus, the desired relationship between the actuator 90' and the tie rod 18 is maintained through the full range of movement of the platen 72'.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. Testing apparatus for applying force to a test-piece having a movable test member adapted for predetermined movement, said apparatus comprising:
   fixed support means adapted to hold said test-piece,
   movable support means movable relative to said fixed support means along a first axis,
   force applying means mounted on said movable support means for translational movement along a second axis transverse to said first axis,
   coupling means connected with said force applying means and adapted to be connected with said test member for transmitting force from the force applying means to the test member,
   and linkage means movable concurrently with said movable support means and coupled to said force applying means for moving it along said second axis so that the movement of the force applying means imparts said predetermined movement to said test member, whereby said force applying means can apply a controlled force to said test member during said movement and unaffected by said movement.

2. The invention as defined in claim 1 wherein said linkage means is a pivotable link pivotally coupled with said fixed support means and pivotally coupled with said force applying means.

3. The invention as defined in claim 1 wherein:
said test member has a pivotal connection on said test-piece,
said coupling means has a pivotal connection with said force applying means,
and said linkage means has a pivotal connection with said force applying means and has a pivotal connection with said fixed support means, the distance between the pivotal connections of said linkage means being equal to the distance between the pivotal connection on said test member and the pivotal connection of said coupling.

4. The invention as defined in claim 3 wherein said movable support means is
a movable platen,
a movable slide mounted on said platen for movement along said second axis,
said coupling means being mounted on said slide,
and said actuator means for moving said platen along said first axis.

5. The invention as defined in claim 4 wherein said force applying means comprises a linear motor having a mounting frame supported for translational movement along said second axis on said platen and an actuator shaft movable along said second axis relative to said mounting frame and connected with said coupling means.

6. The invention as defined in claim 5 wherein said linear motor is a hydraulic motor and including: means for controlling the energization of said motor for applying force to said coupling means during movement of said platen along said first axis.

7. The invention as defined in claim 6 wherein said test-piece is a vehicle steering mechanism with an input shaft and said test member is a tie rod of said mechanism, and including: means for rotatably driving said input shaft during movement of said platen.

8. Testing apparatus for applying force to a test-piece having a pivotable test member, said apparatus comprising:
a frame,
support means on said frame for holding the test-piece and allowing pivotal motion of said test member about a first pivot axis,
a movable platen mounted on said frame for movement along a displacement axis extending perpendicular to said first pivot axis,
force applying means movably mounted on said platen for movement along an axis extending perpendicular to said first pivot axis and to said displacement axis,
coupling means for pivotally coupling said force applying means with said test member for pivotal motion about a second pivot axis,
and a control link pivotally coupled with said force applying means for rotation about a third pivot axis and pivotally coupled with said frame for rotation about a fourth pivot axis,
the distance between said first and second pivot axes being equal to the distance between said third and fourth pivot axes,
whereby movement of said platen along said displacement axis imparts pivotal motion to said test member and to said control link.

9. Testing apparatus for applying force to a test-piece having a movable test member which is to be moved through a range of movement concurrently with the application of test force thereto, said test member being constrained to a first predetermined path of movement, said apparatus comprising:
fixed support means, said test-piece being held on said fixed support means and allowing said test member to be moved through said path of movement,
force applying means adapted to be coupled by a coupling member with said test member for applying a force thereto,
movable support means for supporting and moving said force applying means along a first rectilinear path, said force applying means being movably mounted on said movable support means for movement along a second rectilinear path extending transversely of the first rectilinear path,
and linkage means between said fixed support means and said force applying means to cause said coupling member to follow said first predetermined path of movement.

* * * * *

UNITED STATES PATENT AND TRADEMARK OFFICE
CERTIFICATE OF CORRECTION

PATENT NO. : 4,672,844

DATED : June 16, 1987

INVENTOR(S) : Walter E. Meyer

It is certified that error appears in the above-identified patent and that said Letters Patent is hereby corrected as shown below:

Column 6, line 21, delete "axes" and insert -- axis --.

Line 22, delete "axes" and insert -- axis --.

Line 25, delete "cause" and insert -- causes --.

Column 7, line 26, after "and" delete "said".

Signed and Sealed this

Twenty-seventh Day of September, 1988

Attest:

DONALD J. QUIGG

Attesting Officer

Commissioner of Patents and Trademarks